US012656456B2

(12) United States Patent
Furqan et al.

(10) Patent No.: US 12,656,456 B2
(45) Date of Patent: Jun. 16, 2026

(54) NOISE FIGURE MEASUREMENT IN RADAR SYSTEMS

(71) Applicant: Infineon Technologies AG, Neubiberg (DE)

(72) Inventors: Muhammad Furqan, Linz (AT); Faisal Ahmed, Engerwitzdorf (AT)

(73) Assignee: Infineon Technologies AG, Neubiberg (DE)

( * ) Notice: Subject to any disclaimer, the term of this patent is extended or adjusted under 35 U.S.C. 154(b) by 247 days.

(21) Appl. No.: 18/440,545

(22) Filed: Feb. 13, 2024

(65) Prior Publication Data
US 2024/0288542 A1 Aug. 29, 2024

(30) Foreign Application Priority Data
Feb. 24, 2023 (DE) .......................... 102023104584.9

(51) Int. Cl.
*G01S 7/40* (2006.01)

(52) U.S. Cl.
CPC .............. *G01S 7/4069* (2021.05); *G01S 7/40* (2013.01); *G01S 7/4056* (2013.01)

(58) Field of Classification Search
CPC ........ G01S 7/40; G01S 7/4069; G01S 7/4056; G01S 7/4021
USPC ........................................ 342/165, 173, 174
See application file for complete search history.

(56) References Cited

U.S. PATENT DOCUMENTS

| | | | | | |
|---|---|---|---|---|---|
| 4,045,730 | A | * | 8/1977 | Singer | G01R 21/01 324/103 R |
| 4,104,587 | A | * | 8/1978 | Singer | G01R 21/01 324/95 |
| 4,491,783 | A | * | 1/1985 | Sawayama | G01R 27/28 324/614 |
| 5,191,294 | A | * | 3/1993 | Grace | G01R 29/26 324/613 |
| 5,416,422 | A | * | 5/1995 | Dildine | G01R 29/26 324/613 |
| 6,268,735 | B1 | * | 7/2001 | Craig | G01R 23/20 324/613 |
| 7,808,425 | B2 | * | 10/2010 | Martin Neira | G01S 7/4021 342/120 |
| 8,686,736 | B2 | * | 4/2014 | Forstner | G01R 31/2822 324/537 |

(Continued)

FOREIGN PATENT DOCUMENTS

DE 102020204530 A1 10/2020

*Primary Examiner* — Michael W Justice
(74) *Attorney, Agent, or Firm* — Harrity & Harrity, LLP

(57) ABSTRACT
According to one implementation a signal modulated onto an RF signal is supplied to an RF frontend of a receiver channel to generate a baseband signal, which is supplied to a processing circuit configured to attenuate the baseband signal. A noise parameter of an output signal of the processing circuit is measured while the power of the signal is a first power value and the attenuation is a first attenuation value, while the power is a second power value and the attenuation is the first attenuation value, while the power is the first power value and the attenuation is a second attenuation value, and while the power is set to the second power value and the attenuation is set to the second attenuation value, to obtain first, second, third, and fourth noise values. A value representing a noise figure of the receiver channel is determined based on the noise values.

20 Claims, 4 Drawing Sheets

(56) References Cited

U.S. PATENT DOCUMENTS

| 9,166,706 | B2 * | 10/2015 | Forstner | ............ | G01R 31/3187 |
|---|---|---|---|---|---|
| 9,541,592 | B1 * | 1/2017 | Tsironis | ................ | G01R 29/26 |
| 9,939,479 | B2 * | 4/2018 | Ballo | .................... | G01R 23/20 |
| 10,175,292 | B2 * | 1/2019 | Forstner | ............ | G01R 31/3187 |
| 10,371,733 | B2 * | 8/2019 | Pal | ........................ | G01R 27/28 |
| 10,605,856 | B2 * | 3/2020 | Forstner | ............ | G01R 31/2822 |
| 10,673,545 | B1 * | 6/2020 | Kurvathodil | ....... | H04B 17/0085 |
| 2005/0137814 | A1 * | 6/2005 | Kelly | .................... | G01R 29/26 |
| | | | | | 702/69 |
| 2005/0267716 | A1 * | 12/2005 | Largey | ................ | H04B 17/345 |
| | | | | | 702/191 |
| 2010/0073217 | A1 * | 3/2010 | Martin Neira | ........ | G01S 13/882 |
| | | | | | 342/120 |
| 2012/0126821 | A1 * | 5/2012 | Forstner | ............ | G01R 31/2822 |
| | | | | | 455/226.2 |
| 2014/0187170 | A1 * | 7/2014 | Forstner | ............ | G01R 31/3187 |
| | | | | | 455/67.11 |
| 2015/0309101 | A1 * | 10/2015 | Ballo | .................... | G01R 23/20 |
| | | | | | 324/614 |
| 2016/0041221 | A1 * | 2/2016 | Forstner | ............ | G01R 31/3187 |
| | | | | | 324/750.3 |
| 2018/0188306 | A1 * | 7/2018 | Pal | ........................ | G01R 29/26 |
| 2019/0137564 | A1 * | 5/2019 | Forstner | ............ | G01R 31/2822 |
| 2020/0209353 | A1 * | 7/2020 | Subburaj | .............. | G01S 7/4004 |

* cited by examiner

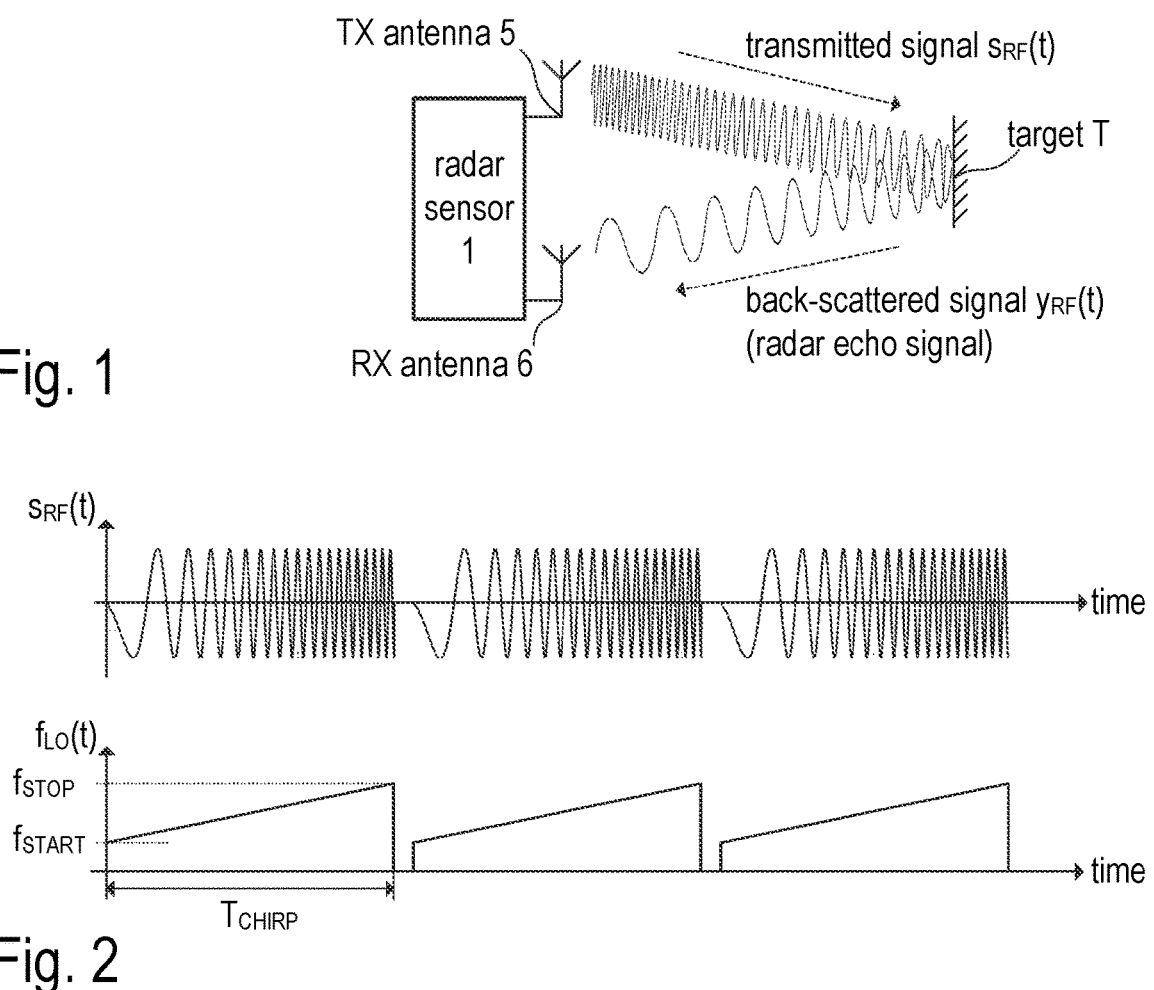
Fig. 1
Fig. 2
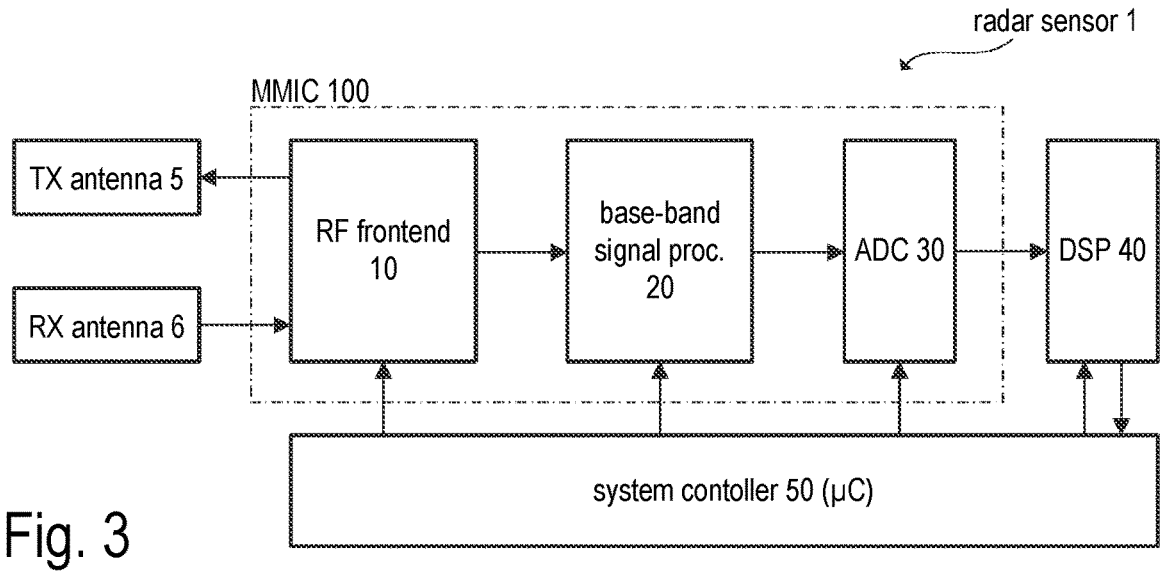
Fig. 3

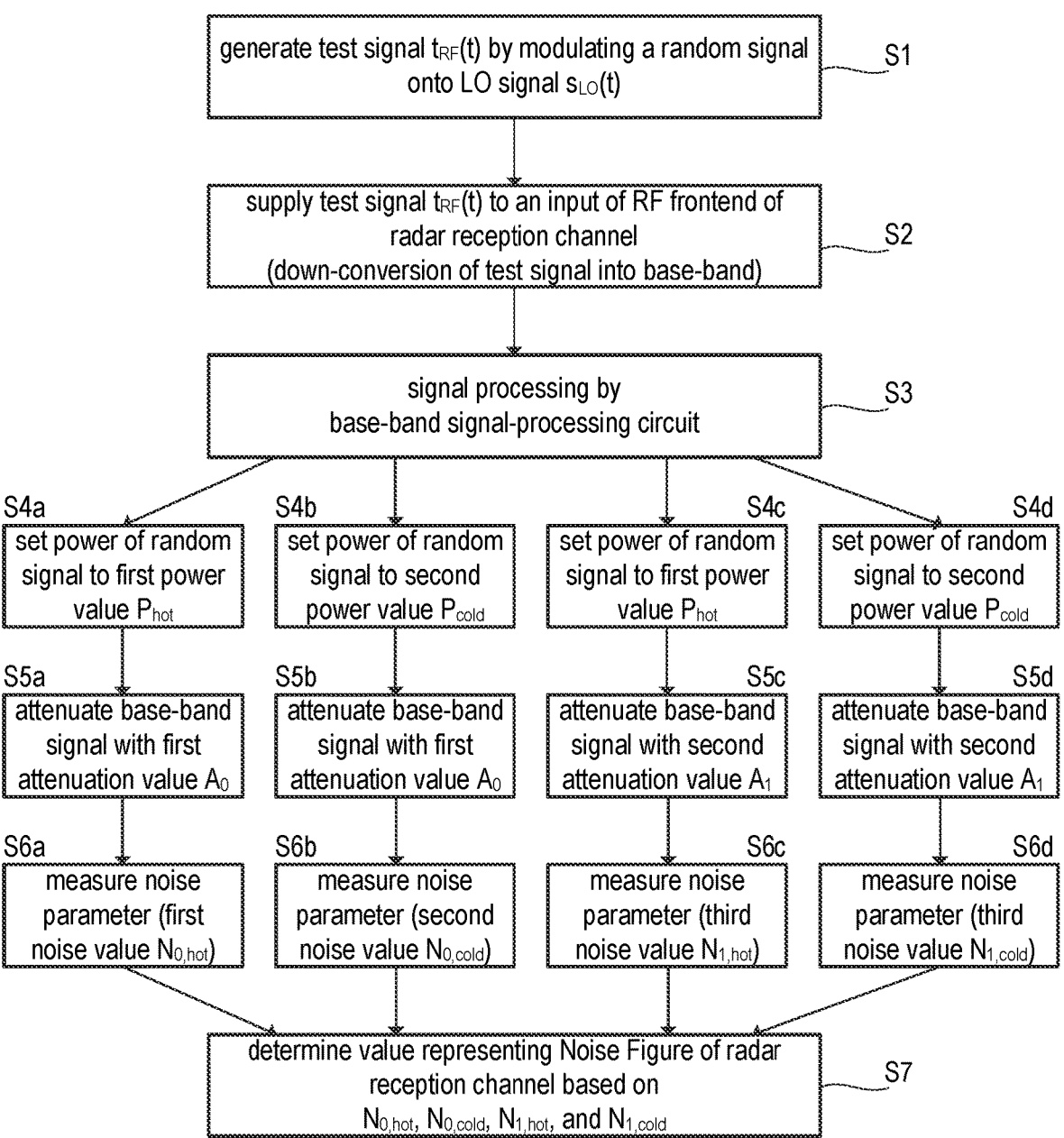

generate test signal $t_{RF}(t)$ by modulating a random signal onto LO signal $s_{LO}(t)$ — S1 supply test signal $t_{RF}(t)$ to an input of RF frontend of radar reception channel
(down-conversion of test signal into base-band) — S2 signal processing by base-band signal-processing circuit — S3

S4a — set power of random signal to first power value $P_{hot}$

S4b — set power of random signal to second power value $P_{cold}$

S4c — set power of random signal to first power value $P_{hot}$

S4d — set power of random signal to second power value $P_{cold}$

S5a — attenuate base-band signal with first attenuation value $A_0$

S5b — attenuate base-band signal with first attenuation value $A_0$

S5c — attenuate base-band signal with second attenuation value $A_1$

S5d — attenuate base-band signal with second attenuation value $A_1$

S6a — measure noise parameter (first noise value $N_{0,hot}$)

S6b — measure noise parameter (second noise value $N_{0,cold}$)

S6c — measure noise parameter (third noise value $N_{1,hot}$)

S6d — measure noise parameter (third noise value $N_{1,cold}$)

determine value representing Noise Figure of radar reception channel based on $N_{0,hot}$, $N_{0,cold}$, $N_{1,hot}$, and $N_{1,cold}$ — S7

Fig. 6

NOISE FIGURE MEASUREMENT IN RADAR SYSTEMS

CROSS-REFERENCE TO RELATED APPLICATION

This application claims priority to German Patent Application No. 102023104584.9 filed on Feb. 24, 2023, the content of which is incorporated by reference herein in its entirety.

TECHNICAL FIELD

The present disclosure relates to the field of radar sensors, in particular a concept for measuring the noise figure in a radar system.

BACKGROUND

Radar sensors can be found in numerous sensing applications in which distances and velocities of objects are to be measured. In the automotive sector, there is an increasing demand for radar sensors that may be used in so-called advanced driver-assistance systems (ADAS). Examples of advanced driver assistive systems include "adaptive cruise control" (ACC) and "radar cruise control" systems. Such systems may be used to automatically adjust the speed of an automobile so as to maintain a safe distance from other automobiles driving ahead. Other examples of advanced driver assistive system are blind-spot monitors, which may employ radar sensors to detect other vehicles in the blind spot of a vehicle. Particularly autonomous cars may use numerous sensors, such as radar sensors, to detect and locate various objects in their surroundings. Information about the position and velocity of objects in the area of an autonomous car is used to help navigate safely.

Modern radar systems make use of highly integrated RF circuits which may incorporate all core functions of an RF font-end of a radar transceiver in one single package (single chip transceiver). Such RF front-ends usually include, inter alia, a local RF oscillator (LO), power amplifiers (PA), low-noise amplifiers (LNA), and mixers. Frequency-modulated continuous-wave (FMCW) radar systems use radar signals whose frequency is modulated by ramping the signal frequency up and down. Such radar signals are often referred to as "chirp signals" or simply as "chirps". In case of linear chirp signals the term "LFM signals" is sometimes used, wherein LFM stands for "linear frequency modulation". A radar sensor usually radiates sequences of chirps using one or more antennas, and the radiated signal is backscattered by one or more objects (referred to as radar targets) located in the "field of view" of a radar sensor. The backscattered signals (radar echoes) are received and processed by the radar sensor. The detection of the radar targets is usually accomplished using digital signal processing.

The Noise Figure (Rauschzahl), sometimes also called Noise Factor, of a radar reception channel is a commonly used value to characterize the noise generated in a radar reception channel. Dependent on the application of the radar system, the Noise Figure may be important for quality control. However, the actual measurement of the Noise Figure is challenging at millimeter-wave frequencies (30-300 GHz) during production testing of Monolithic Microwave Integrated Circuits (MMICs). The reason therefore is the unavailability of an accurately matched RF source termination impedance (usually 50 Ohms) in the MMIC as well as in automated test equipment (ATE). However, conventional techniques for measuring the Noise Figure are highly sensitive to the input matching. Accordingly, the problem underlying the implementation described herein is to provide a system and a method that allow Noise Figure measurements in a radar MMIC using built in test equipment (BITE), in particular in situations in which a matched RF source termination is not available (which may be the case for an ATE) or when high performance, calibrated test equipment is too costly in terms of setup and measurement time.

SUMMARY

The problem mentioned above is solved by the method of claim 1 and the radar system of claim 10. Various examples and further developments are covered by the dependent claims.

According to one implementation the method includes generating, as a test signal, a random signal modulated onto an RF signal, wherein the power of the random signal is configurable, and supplying the test signal to an input of an RF frontend of a radar receiver channel. The RF frontend is configured to down-convert the test signal into a baseband to provide a baseband signal, which is supplied to a baseband signal processing circuit that is configured to attenuate the baseband signal with a configurable attenuation. The method further includes: measuring a noise parameter of an output signal of the baseband signal processing circuit to obtain a first noise value, while the power of the random signal is set to a first power value and the attenuation is set to a first attenuation value; measuring the noise parameter of the output signal to obtain a second noise value, while the power of the random signal is set to a second power value and the attenuation is set to the first attenuation value; measuring the noise parameter of the output signal to obtain a third noise value, while the power of the random signal is set to the first power value and the attenuation is set to a second attenuation value; and measuring the noise parameter of the output signal to obtain a fourth noise value, while the power of the random signal is set to the second power value and the attenuation is set to the second attenuation value. Furthermore, the method includes determining a value representing a noise figure of the radar receiver channel based on the first, second, third and fourth power values.

A further implementation relates to a radar system that includes a test signal generator configured to generate, as a test signal, a random signal modulated onto an RF signal, wherein the power of the random signal is configurable, and a radar receiver channel. The radar receiver channel includes: an RF frontend that is configured to receive the test signal and to down-convert the test signal into a baseband to provide a baseband signal; a baseband signal processing circuit configured to receive the baseband signal and to attenuate—by an attenuator circuit—the base-band signal with a configurable attenuation; and a digital-to-analog converter configured to digitize an output signal of the baseband signal processing circuit. Furthermore, the radar system includes a system controller and a processing circuit. The system controller is configured to control the operation of the test signal generator and the attenuator circuit to set the power of the random signal and the attenuation of the attenuator circuit. The processing circuit is configured to process the digitized output signal of the baseband signal processing circuit and further configured to: determine a noise parameter of an output signal of the base-band signal processing circuit to obtain a first noise value, while the power of the random signal is set to a first power value and the attenuation is set to a first attenuation value; determine the noise parameter of the output signal to obtain a second noise value, while the power of the random signal is set to a second power value and the attenuation is set to the first attenuation value; determine the noise parameter of the output signal to obtain a third noise value, while the power of the random signal is set to the first power value and the attenuation is set to a second attenuation value; determine the noise parameter of the output signal to obtain a fourth noise value, while the power of the random signal is set to the second power value and the attenuation is set to the second attenuation value; and determine a value representing a noise figure of the radar receiver channel based on the first, second, third and fourth power values.

BRIEF DESCRIPTION OF THE DRAWINGS

The implementation can be better understood with reference to the following drawings and descriptions. The components in the figures are not necessarily to scale; instead emphasis is placed upon illustrating the principles of the implementation. In the figures, like reference numerals designate corresponding parts. In the drawings:

FIG. 1 is a sketch illustrating the operating principle of an FMCW radar system for distance and/or velocity measurement.

FIG. 2 includes two timing diagrams illustrating the frequency modulation of the RF signal used in FMCW radar systems.

FIG. 3 is a block diagram illustrating the basic structure of an FMCW radar device.

FIG. 6 is a flow chart illustrating one example of a method for determining the Noise Figure of the reception channel of FIG. 5.

DETAILED DESCRIPTION

Figures 4, 5:
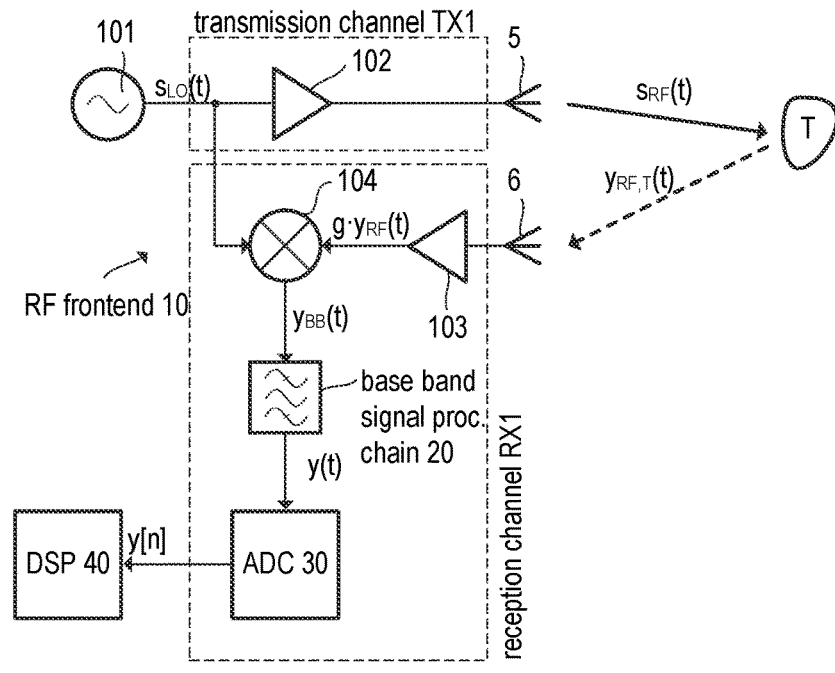
FIG. 4 is a circuit diagram illustrating one example of a reception channel of a radar sensor.
FIG. 5 is a circuit diagram illustrating a reception channel of a radar sensor in accordance with one implementation.

FIG. 1 illustrates a conventional frequency-modulated continuous-wave (FMCW) radar sensor 1. In the present example, separate transmission (TX) and reception (RX) antennas 5 and 6, respectively, are used (bistatic or pseudo-monostatic radar configuration). However, it is noted that a single antenna can also be used, in which case the reception antenna and the transmission antenna will be physically the same (monostatic radar configuration). The transmission antenna 5 (quasi-) continuously radiates an RF signal $s_{RF}(t)$ which is frequency-modulated, for example, by a saw-tooth-shaped signal. When the radiated signal $s_{RF}(t)$ is back-scattered at an object T, which may be located in the radar channel within the measurement range of the radar device (e.g., within the radar system's "field of view"), the back-scattered signal $y_{RF}(t)$ is received by the reception antenna 6. The object T is usually referred to as "radar target".

In a more general example, more than one target may be in the field of view of a radar sensor, and an antenna array may be used instead of a single RX antenna. Similarly, an antenna array may be used instead of a single TX antenna. Using multiple RX and TX antennas in a multi-channel radar system allows for the measurement of the angle of incidence of a radar echo, usually referred to as direction of arrival (DoA). Measuring the direction of arrival is important for many applications, and thus most radar sensors will make use of antenna arrays. To keep the drawings simple, only one TX antenna and one RX antenna (and respective TX and RX channels) are shown in the figures. It is understood that the concepts described herein are readily applicable to multi-channel radar sensors with antenna arrays, as well.

FIG. 2 illustrates the mentioned conventional frequency-modulation of the signal $s_{RF}(t)$. As shown in the top diagram of FIG. 2, the signal $s_{RF}(t)$ is composed of a series of "chirps", e.g., sinusoidal waveforms with increasing (up-chirp) or decreasing (down-chirp) frequency. In the present example, the instantaneous frequency $f_{LO}(t)$ of a chirp increases linearly from a start frequency $f_{START}$ to a stop frequency $f_{STOP}$ within a defined time span $T_{CHIRP}$ (see bottom diagram of FIG. 2). Such a chirp is also referred to as a linear frequency ramp. A linear frequency-modulated (LFM) signal with a sequence of three identical linear frequency ramps is illustrated in FIG. 2. It is noted, however, that the parameters $f_{START}$, $f_{STOP}$, $T_{CHIRP}$ as well as the pause between the individual frequency ramps may vary dependent on the actual implementation of the radar device 1 and may also vary during operation of the radar device. In practice the frequency variation may be, for example, linear (linear chirp, frequency ramp), exponential (exponential chirp) or hyperbolic (hyperbolic chirp). It is noted that frequency modulation is not the only type of modulation that can be used in radar systems. For example some radar systems may use phase modulation. Such systems are called PMCW (phase-modulated continuous-wave) radar systems. Although FMCW radar systems are shown in the figures, it is nevertheless understood that the implementations described herein are not limited to FMCW radar devices or systems Before discussing the implementations in more detail, the generic structure of an example of a radar system is described. FIG. 3 is a block diagram that illustrates an example structure of radar sensor 1. At least one transmission antenna 5 (TX antenna(s)) and at least one reception antenna 6 (RX antenna(s)) are connected to an RF frontend 10, which may be integrated in a semiconductor chip 100, usually referred to as MMIC. The RF frontend 10 may include all of the circuit components needed for RF signal processing. Such circuit components may include, for example, a local oscillator (LO), RF power amplifiers, low noise amplifiers (LNAs), directional couplers such as rat-race-couplers or circulators, and mixers for the down-conversion of RF signals (e.g., the received signal $y_{RF}(t)$, see FIG. 1) into the baseband or IF-band.

As mentioned, antenna-arrays may be used instead of single antennas. The depicted example shows a bistatic (or pseudo-monostatic) radar system, which has separate RX and TX antennas. In the case of a monostatic radar system, a single antenna or a single antenna array may be used for both, receiving and transmitting electromagnetic (radar) signals. In this case a directional coupler (e.g., a circulator) may be used to separate RF signals to be transmitted to the radar channel from RF signals received from the radar channel.

In the case of an FMCW radar sensor, the RF signals radiated by the TX antenna 5 may be in a range of between approximately 20 GHZ (e.g., 24 GHZ) and 82 GHZ (e.g., about 77 GHz in automotive applications). As mentioned, the RF signal received by the RX antenna 6 includes the radar echoes, e.g., the signals that have been back-scattered at the radar target(s). The received RF signal $y_{RF}(t)$ is down-converted into the base band and is further processed in the baseband using analog signal processing (see FIG. 3, baseband signal processing chain 20), which basically includes filtering and amplification of the baseband signal and thus determines the bandwidth of the received signal.

The baseband signal is finally digitized using one or more analog-to-digital converters 30 and is then further processed in the digital domain (see FIG. 3, digital signal processing chain implemented, e.g., in digital signal processing circuit 40). The overall system and its operation are controlled by a system controller 50, which may be, at least partly, implemented by a processor which can execute appropriate software/firmware. The processor may be included, e.g., in a microcontroller, a digital signal processor, or the like. The digital signal processing (DSP) circuit 40 may be part of the system controller 50 or separate therefrom. The digital signal processing circuit 40 may be partly implemented using hard-wired or one-time programmable logic circuitry and partly using a processor executing software (firmware). Alternatively, the digital signal processing circuit may be substantially implemented using a processor programmed with software/firmware to perform the functions described herein.

It is noted that the components shown in FIG. 3 may, in some examples, be integrated in a single semiconductor chip. For example, the RF frontend 10 and the analog baseband signal processing chain 20 and, in some examples, the ADC 30, the signal processor 40 and the system controller 50 may be integrated into a single MMIC to form a single chip radar system. However, the components may also be distributed among two or more integrated circuits.

FIG. 4 illustrates one example of the RF frontend 10, which may be included in the radar sensor shown in FIG. 3. It is noted that FIG. 4 is a simplified circuit diagram illustrating the basic structure of an RF frontend. Actual implementations, which may depend on the application, may be significantly more complex. In particular, many practical implementations include multiple reception and transmission channels, wherein only one reception channel and one transmission channel is shown in the depicted example in order to keep the illustration simple. The RF frontend 10 includes a local oscillator (LO) 101 that generates a RF signal $s_{Lo}(t)$, which may be frequency-modulated as explained above with reference to FIG. 2. The signal $s_{LO}(t)$ is also referred to as LO signal. In some situations, the LO signal is an unmodulated continuous-wave (CW) signal. In radar applications, the LO signal is usually in the SHF (Super High Frequency) or the EHF (Extremely High Frequency or millimeter-wave) band, e.g., between 76 GHz and 82 GHz in automotive applications.

The LO signal $s_{LO}(t)$ is processed in the transmit signal path (transmission channel, TX channel), as well as in the receive signal path (reception channel, RX channel). The transmit signal $s_{RF}(t)$, which is radiated by the TX antenna 5, is generated by amplifying the (e.g., frequency-modulated) LO signal $s_{LO}(t)$, e.g., using an RF power amplifier 102. The output of the amplifier 102 is coupled to the TX antenna 5 e.g., via strip lines, a coupler, matching network, etc. (not shown in FIG. 4). The received signal $y_{RF}(t)$, which is provided by the RX antenna 6, is provided to a mixer 104. In the present example, the received signal $y_{RF}(t)$ (e.g., the antenna signal) is pre-amplified by RF amplifier 103 (e.g., by a low-noise amplifier, LNA, with gain g), so that the mixer receives the amplified signal $g \cdot y_{RF}(t)$ at its RF input. The mixer 104 further receives the LO signal $s_{Lo}(t)$ at its reference input and is configured to down-convert the amplified antenna signal $g \cdot y_{RF}(t)$ into the base band. The resulting baseband signal at the mixer output is denoted as $y_{BB}(t)$.

The baseband signal $y_{BB}(t)$ is further processed by the analog baseband signal processing chain 20 (see also FIG. 3), which basically includes one or more filters (e.g., a band-pass or a low-pass) for removing undesired side bands and image frequencies, as well as one or more amplifiers. The analog output signal of the baseband signal processing chain 20 is denoted as $y(t)$ and may be supplied to an analog-to-digital converter (ADC) 30 (see also FIG. 3).

The digital signal $y[n]$ output by the ADC 30 is referred to as digital radar signal and includes the digital radar data. The digital radar signal may be supplied to a processor such as digital signal processing circuit 40, which is configured to further process the digital radar signal, e.g., by applying algorithms summarized as Range/Doppler processing. The digital signal processing circuit may also perform functions to test different components of the radar system (self-test routines). The implementation of the circuit components shown in FIG. 4 are as such known in the field of radar sensors and is thus not explained in more detail.

As mentioned in the introduction, the Noise Figure (NF) of a radar reception channel is a common measure to characterize the noise generated in a radar reception channel. The measurement of the noise figure at millimeter-wave frequencies may usually require calibrated RF instruments including accurate RF terminators and calibrated noise sources. Probing cards in ATEs, which are commonly be used during production testing are not configured for RF frequencies and therefore are not suitable to measure the noise figure at RF/millimeter-wave frequencies. Moreover, each shipped MMIC should pass a quality check in order to ensure that noise performance requirements are met, and therefore such quality checks with noise figure measurements in a component verification lab are prohibitive in terms of time and cost.

FIG. 5 illustrates a modification/enhancement of the circuit of FIG. 4, which allows to determine the Noise Figure within an MMIC during a self-test using a test signal $t_{RF}(t)$ that is generated in the MMIC based on the LO signal $s_{LO}(t)$. According to FIG. 5, the RF frontend includes the LNA 103 and the mixer 104 (like the example of FIG. 4). The additional coupler 105 allows to inject the RF test signal $t_{RF}(t)$ into the receive signal path of the RX channel. That is, the coupler 105 can direct the antenna signal as well as the test signal $t_{RF}(t)$ to the input of the RF frontend 10.

The coupler 105 may be a branch line coupler, a rat race coupler or the like. On the one hand, it couples the antenna 5 to the RF input of the mixer 104 (e.g., via the LNA 103) and, on the other hand, also couples the output of the test signal generator 300 to the RF input of the mixer 104. Accordingly, during testing, the RF test signal $t_{RF}(t)$ is processed by the RX channel in the same way as an antenna signal during normal operation of the radar sensor. In the implementations described herein, the RF test signal is generated by modulating a (pseudo-) random signal onto the LO signal $s_{LO}(t)$. The test signal generator 300 is discussed in more detail further below.

The reference input of the mixer 104 receives the LO signal $s_{LO}(t)$ and, consequently, the mixer 104 down-converts the RF test signal $t_{RF}(t)$ into the base band. The resulting baseband signal basically includes the mentioned random signal plus the noise generated by the components in the RF frontend (e.g., mixer and amplifier). The baseband signal is processed by the baseband signal processing chain 20 like in the example of FIG. 4. However, as compared to the FIG. 4, the baseband signal processing chain 20 does not only include filters and an (optional) amplifier (collectively represented by block 205) but also an attenuator circuit 210 with a configurable attenuation. In the present example, the attenuator circuit 210 includes an input switch 211 and an output switch 214. These switches are configured to provide two alternative signal paths between the input of the input switch 211 and the output of the output switch. That is, dependent on the state of the switches 211 and 214, the base band signal travels either through an attenuator 212 with a defined, preset attenuation, or through a line 213 which basically causes no attenuation (short circuit line).

The switches 211 and 214 may be controlled (directly or indirectly) by the system controller 50 (see FIG. 2) or any other suitable control circuit. In the present example, the system controller 50 can control to attenuator circuit 210 to provide either a first attenuation value $A_0$ of approximately 0 dB (zero attenuation) or the second attenuation value $A_1$ provided by the attenuator 212. In another implementation, the first attenuation value $A_0$ is not zero but greater than 0 dB. The purpose and the use of the attenuator circuit 210 with switchable attenuation is described in the following.

FIG. 6 is a flow chart which describes one example implementation of a concept for determining the Noise Figure of a radar reception channel, which includes an attenuator with configurable attenuation in the base-band signal processing circuit as shown in FIG. 5. In accordance with FIG. 6, the method includes generating—as test signal $t_{RF}(t)$—a random signal modulated onto an RF signal (which is the LO signal $s_{LO}(t)$ in the present example). The power of the random signal is configurable (see FIG. 6, box S1). The generation of the test signal will be discussed later.

The method further includes supplying the test signal $t_{RF}(t)$ to an input of the RF frontend 20 of the radar receiver channel RX1 (cf. FIG. 5), wherein the RF frontend 10 is configured to down-convert the test signal $t_{RF}(t)$ into the baseband to provide a baseband signal (see FIG. 6, box S2). The baseband signal is supplied to the baseband signal processing circuit 20, which includes the attenuator circuit 210 with a configurable attenuation (see FIG. 6, box S3). In accordance with the present example, four measurements are made to obtain four noise values $N_{0,hot}$, $N_{0,cold}$, $N_{1,hot}$, and $N_{1,cold}$. At this point, it should be noted that, in accordance with the noise figure definition the "cold temperature" measurements (to determine $N_{0,cold}$ and $N_{1,cold}$) may be made at the thermal equilibrium noise power at the standard reference temperature $T_0$ of 290 Kelvin. However, the error introduced due to a possible deviation from this reference temperature $T_0$ can be reduced by increasing the noise temperature of the hot measurement.

First, the power of the random signal is set to a first power value $P_{hot}$ and the attenuation of the attenuator circuit 210 is set to a first attenuation value $A_0$ (see FIG. 6, boxes S4a, S5a). Then a measurement of the noise parameter of the output signal y(t) of the baseband signal processing circuit 20 is made to obtain the first noise value $N_{0,hot}$ (see FIG. 6, box S6a). Second, the power of the random signal is set to a second power value $P_{cold}$ and the attenuation of the attenuator circuit 210 is still set to the first attenuation value $A_0$ (see FIG. 6, boxes S4b, S5b). Then a measurement of the noise parameter of the output signal y(t) is made to obtain the second noise value $N_{0,cold}$ (see FIG. 6, box S6b). Third, the power of the random signal is set again to the first power value $P_{hot}$ and the attenuation of the attenuator circuit 210 is set to a second attenuation value $A_1$ (see FIG. 6, boxes S4c, S5c). Then a measurement of the noise parameter of the output signal y(t) is made to obtain the third noise value $N_{1,hot}$ (see FIG. 6, box S6c). Fourth, the power of the random signal is set to the second power value $P_{cold}$ and the attenuation of the attenuator circuit 210 is still set to the second attenuation value $A_1$ (see FIG. 6, boxes S4d, S5d). Then a measurement of the noise parameter of the output signal y(t) is made to obtain the fourth noise value $N_{1,cold}$ (see FIG. 6, box S6d). It is understood that the order of the four measurements is not important. The four noise values $N_{0,hot}$, $N_{0,cold}$, $N_{1,hot}$, and $N_{1,cold}$ may be determined in an arbitrary order.

The method finally includes determining a value representing a noise figure of the radar receiver channel RX1 based on the first, second, third and fourth power values $N_{0,hot}$, $N_{0,cold}$, $N_{1,hot}$, and $N_{1,cold}$ (see FIG. 6, box S7).

In the implementations described herein, the first attenuation value $A_0$ is substantially 0 dB (e.g., $A_0$=1 which means substantially no attenuation) and the second attenuation value $A_1$ is greater than 0 dB (e.g., $A_1$<1). This corresponds to the example of FIG. 5 but is not necessarily the case. Furthermore, the first power value $P_{hot}$ is assumed to be greater than the second power value $P_{cold}$ (e.g., $P_{hot}$<$P_{cold}$).

To determine the noise figure, the ratios $Y_0=N_{0,hot}/N_{0,cold}$ and $Y_1=N_{1,hot}/N_{1,cold}$ are calculated in accordance with one implementation. The Noise Fig. $NF_{DUT}$ can be calculated based on these ratios $Y_0$ and $Y_1$. In the present example, the Noise Fig. can be calculated in accordance with the following formula:

$$NF_{DUT} = (Y_1 - 1)(NF_{att} - 1)/(G_{RX}(Y_0 - Y_1)), \qquad (1)$$

wherein $Y_0$ and $Y_1$ denote the above-mentioned ratios, $G_{RX}$ denotes a gain value of the radar receiver channel RX1, and $NF_{att}$ denotes a parameter characterizing the behavior of the attenuator circuit. The gain value $G_{RX}$ is either a known system parameter or it can be measured using the circuit of FIG. 5 as will be discussed later.

The parameter $NF_{att}$ characterizing the behavior of the attenuator circuit 210 and it depends on the attenuation $L=A_1$ of the attenuator 212 and the reflection coefficient $\Gamma$ at the input of the attenuator circuit 210. More specifically, the parameter $NF_{att}$ can be determined using the following formula:

$$NF_{att} = 1 + (L - 1)(L + |\Gamma|^2)/(L(1|\Gamma|^2)). \qquad (2)$$

Is is understood that the formulas (1) and (2) provided above are only valid for the case shown in FIG. 5, in which $A_0$=1 (or $A_0$=0 dB) and $A_1$ is the constant attenuation L of attenuator 212. However, the formulas may be easily adapted if the attenuation value $A_0$ is greater than zero decibel.

The mentioned measurements of the noise parameter of the output signal y(t) of the base-band signal processing circuit 20 is made in the digital domain, for example by the digital signal processing circuit 40 (see FIG. 3). The noise parameter may be, for example, the noise power spectral density (PSD) of the noise included in the output signal y(t), and the resulting noise values $N_{0,hot}$, $N_{0,cold}$, $N_{1,hot}$, and $N_{1,cold}$ can be derived therefrom. The PSD can be integrated over bandwidth of interest to calculate the noise power No or, in some implementations, the PSD can be used directly instead of the noise power No as only the ratios $Y_0$ and $Y_1$ are of interest. To determine the noise PSD (for specific power values $P_{hot}$, $P_{cold}$ and attenuation values $A_0$, $A_1$) the output signal y(t) is digitized (see FIG. 3, ADC 30) and the resulting digital signal y[n] may be Fourier transformed to estimate the noise PSD. In some implementations, the Fast Fourier Transform (FFT) algorithm may be used to calculate the noise PSD (noise parameter). However, other algorithms such as the Goertzel algorithms may be used instead of the FFT. The signal processing circuit may include hard-wired logic circuitry configured to efficiently calculate Fourier Transforms. Alternatively, the FFT algorithm (or any other suitable algorithm) may be implemented using software and a processor executing the software instructions.

Figure 7:
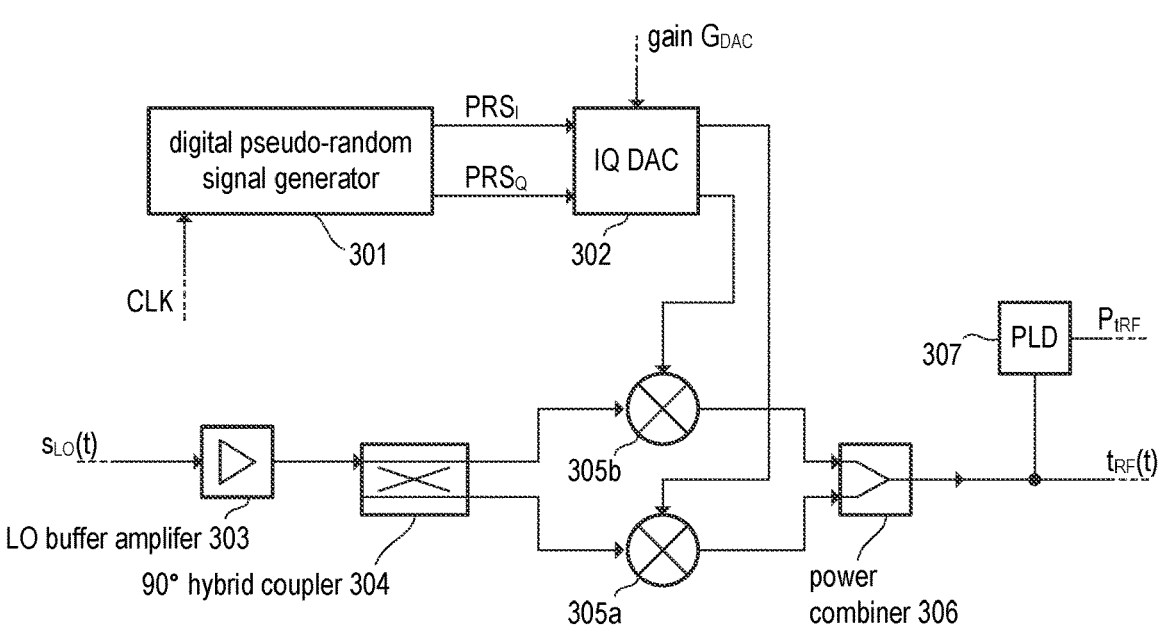
FIG. 7 is an example implementation of a test signal generator, which may be used in the implementation of FIG. 5.

Having explained the novel concept for determining the Noise Figure of a radar receiver channel, the test signal generator 300 (cf. FIG. 5) is discussed in more detail. As mentioned, the test signal generator 300 is configured to generate the test signal $t_{RF}(t)$ by modulating a random signal onto an RF signal which is the LO signal $s_{LO}(t)$ or derived therefrom (e.g., by a buffer). FIG. 7 illustrates an example implementation of the test signal generator 300.

In the depicted implementation, a random sequence is generated in the digital domain and in accordance with a clock signal by a digital pseudo-random signal generator 301. The term "pseudo-random" means that the random sequence has de-facto the same characteristic as true random sequences but is not truly random in its nature. However, the difference between random and pseudo-random is not important for the present discussion. Various ways of generating random sequences are as such known and thus not further discussed herein. The pseudo-random signal generator 301 may include hard-wired or one-time programmable logic circuitry. However, the pseudo-random signal generator 301 may also consist of a combination of hardware and software. For example, the pseudo-random signal generator 301 may be implemented using software instructions that, when executed by a processor, cause the processor (in combination with its peripheral circuitry) to generate the random sequence. The processor may be the processor of the system controller 50. Alternatively, a separate processor may be used in the pseudo-random signal generator 301. In the present example, the pseudo-random signal generator 301 generates a sequence of random complex numbers, wherein the real part and the imaginary part of the complex numbers can be regarded as in-phase component $PRS_I$ and quadrature component $PRS_Q$ of the (pseudo-) random sequence.

The digital random sequence (in-phase component $PRS_I$ and quadrature component $PRS_Q$) is converted into corresponding analog in-phase and quadrature signals. For this purpose the test signal generator 300 includes a digital-to-analog converter 302, which has two channels, one for the in-phase component and one for the quadrature component. The analog in-phase and quadrature signals are supplied to the mixers 305a and 305b, respectively.

The LO signal $s_{LO}(t)$ is supplied—via an optional buffer amplifier 303—to a 90° hybrid coupler 304, which is configured to generate corresponding in-phase and quadrature LO-signals, which are also supplied to the mixers 305a and 305b, respectively. The mixer 305a modulates the in-phase random signal onto the (amplified, as the case may be) in-phase LO signal, and the mixer 305b modulates the quadrature random signal onto the quadrature LO signal. The resulting modulated in-phase and quadrature signals are supplied to a power combiner 306, which superposes in-phase and quadrature signals to provide the test signal $t_{RF}(t)$.

In essence, the test signal generator 300 of FIG. 7 performs a single side-band modulation. It is noted that other modulation techniques such as double-sideband modulation may be used in other implementations. In the depicted example, the test signal generator 300 includes a RF power level detector 307 (power level sensor) which is configured to provide a measured signal that indicates the power level of the RF test signal $t_{RF}(t)$. It is noted that the RH power level detector is optional and may be omitted in some implementations.

In the example of FIG. 7, the power of the random signal (represented by in-phase and quadrature components) can be changed by adjusting the gain $G_{DAC}$ of the analog-to-digital converter 302. For example, the gain $G_{DAC}$ may be set to a first value $G_{hot}$ in order to set the power of the random signal (included in the test signal $t_{RF}(t)$) to the first power value $P_{hot}$ or to a second value $G_{cold}$ in order to set the power of the random signal to the second power value $P_{cold}$. It is understood that the power of the random signal can be adjusted in different ways. For example, the analog output signals of the digital-to-analog converter 302 may be amplified instead of adjusting the gain $G_{DAC}$. Alternatively, the power level of the random sequence may be adjusted in the digital domain.

The process illustrated in FIG. 6, in particular the attenuation of the attenuator circuit 211 and the power of the random signal included in the RF test signal $t_{RF}(t)$ may be controlled, e.g., by the system controller 50 (see FIG. 3). For example, the system controller 50 may control (directly or indirectly) the switches 211 and 214 (see FIG. 5) to change the attenuation from $A_0$ to $A_1$ and vice versa. Furthermore, the system controller 50 may control (directly or indirectly) the gain of the digital-to-analog converter 302 (see FIG. 6) to change set the power of the random signal, which is modulated onto the LO signal to generate the RF test signal $t_{RF}(t)$.

Figure 8:
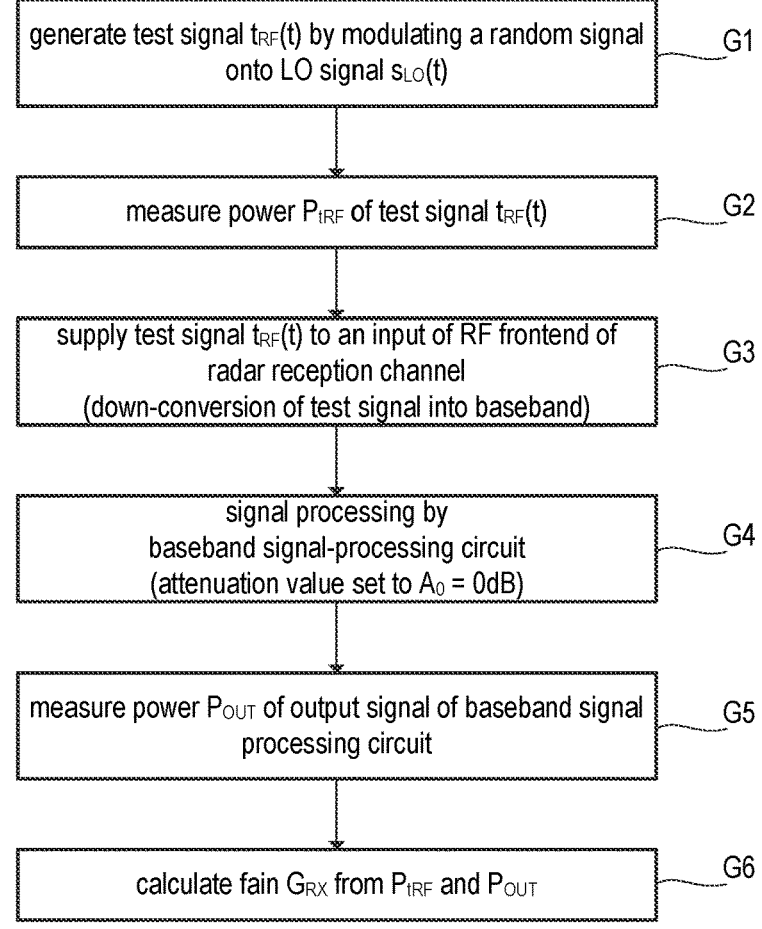
FIG. 8 is a flow chart illustrating one approach for determining the gain of a radar receiver channel.

As mentioned above, the gain $G_{RX}$ of the radar receiver channel RX1 (see FIG. 5) is needed to calculate the noise figure. Although the gain $G_{RX}$ is a known system parameter, it may change due to temperature drift and other drift effects. Therefore, the gain $G_{RX}$ can be measured to obtain a more precise value. FIG. 8 is a flow chart illustrating one approach for determining the gain $G_{RX}$ of a radar receiver channel using the circuit of FIG. 5.

According to FIG. 8, the method includes generating the test signal $t_{RF}(t)$ by modulating a random signal onto the LO signal $s_{LO}(t)$ (see FIG. 8, box G1), and measuring the power level $P_{tRF}$ of the test signal (see FIG. 8, box G2). The test signal $t_{RF}(t)$ is supplied to the input of the RF frontend 10 of the radar receiver channel RX1 (see FIG. 8, box G3), and the baseband signal provided by the RF frontend 10 is processed by the baseband signal processing circuit 20, wherein the attenuation value of the attenuator circuit is set to, e.g., $A_0 = 0$ dB (see FIG. 8, box G4). The power of the output signal y(t) of the baseband signal processing circuit 20 may be determined in the digital domain in any common way (see FIG. 8, box G4). For example, the output signal y(t) is digitized, and the resulting digital signal y[n] may be Fourier transformed to determine the power level Pour in the frequency domain. The sought gain $G_{RX}$ can then be calculated (FIG. 8, box G6) from the power PIRE of the RF test signal (input signal) and the power Pour of the output signal y(t) provided by the radar receiver channel RX1 (e.g., $G_{RX} = P_{OUT}/P_{tRF}$). It is understood that, if the attenuation value $A_0$ is not zero decibel during the measurement, the value $A_0$ has to be considered in the calculation of $G_{RX}$.

Using the process described above, the gain $G_{RX}$ can be measured each time before the Noise Figure is determined as shown in the flow chart of FIG. 6. It is understood that the gain measurement process of FIG. 8 can also be controlled by the system controller 50 (see FIG. 3).

Although the implementation has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated example implementations of the implementation.

The invention claimed is:

1. A method comprising:

generating, as a test signal, a random signal modulated onto an RF signal, wherein a power of the random signal is configurable;

supplying the test signal to an input of an RF frontend of a radar receiver channel, the RF frontend being configured to down-convert the test signal into a baseband to provide a baseband signal, the baseband signal being supplied to a baseband signal processing circuit that is configured to attenuate the baseband signal with a configurable attenuation;

measuring a noise parameter of an output signal of the baseband signal processing circuit to obtain a first noise value, the noise parameter being measured to obtain the first noise value while the power of the random signal is set to a first power value and the configurable attenuation is set to a first attenuation value;

measuring the noise parameter of the output signal to obtain a second noise value, the noise parameter being measured to obtain the second noise value while the power of the random signal is set to a second power value and the configurable attenuation is set to the first attenuation value;

measuring the noise parameter of the output signal to obtain a third noise value, the noise parameter being measured to obtain the third noise value while the power of the random signal is set to the first power value and the configurable attenuation is set to a second attenuation value;

measuring the noise parameter of the output signal to obtain a fourth noise value, the noise parameter being measured to obtain the fourth noise value while the power of the random signal is set to the second power value and the configurable attenuation is set to the second attenuation value; and determining a value representing a noise figure of the radar receiver channel based on the first noise value, the second noise value, the third noise value, and the fourth noise value.

2. The method of claim 1 further comprising:

measuring a gain value of the radar receiver channel, wherein determining the value representing the noise figure is further based on the measured gain value.

3. The method of claim 1, wherein determining the value representing the noise figure comprises:

calculating a first ratio between the first noise value and the second noise value;

calculating a second ratio between the third noise value and the fourth noise value; and calculating the value representing the noise figure based on the first ratio and the second ratio.

4. The method of claim 3, wherein calculating the value representing the noise figure is further based on a parameter characterizing a behavior of an attenuator circuit included in the baseband signal processing circuit.

5. The method of claim 1, wherein determining the value representing the noise figure comprises:

calculating a first ratio between the first noise value and the second noise value;

calculating a second ratio between the third noise value and the fourth noise value; and calculating a noise figure value NFDUT of the radar receiver channel in accordance with:

$$NFDUT = (Y1 - 1)(NFatt - 1)/(GRX(Y0 - Y1)),$$

wherein Y0 denotes the first ratio, Y1 denotes the second ratio, GRX denotes a gain value of the radar receiver channel, and NFatt denotes a parameter characterizing a behavior of an attenuator circuit included in the baseband signal processing circuit.

6. The method of claim 5, wherein the parameter characterizing the behavior of the attenuator circuit depends on an attenuation of the attenuator circuit and a reflection coefficient at an input of the attenuator circuit.

7. The method of claim 1, wherein the first attenuation value is substantially 0 dB.

8. The method of claim 4, wherein the attenuator circuit includes switches configured to connect, between an input of the attenuator circuit and an output of the attenuator circuit, an attenuator having the second attenuation value, or a line that provides a short circuit between the input of the attenuator circuit and the output of the attenuator circuit to provide the first attenuation value of substantially 0 dB.

9. The method of claim 1, wherein the random signal has an in-phase component and a quadrature component which are modulated onto the RF signal using an IQ modulator.

10. The method of claim 9, wherein the in-phase component and the quadrature component are provided by a digital-to-analog converter that receives corresponding in-phase and quadrature digital pseudo-random sequences.

11. A radar system comprising:

a test signal generator configured to generate, as a test signal, a random signal modulated onto an RF signal, wherein a power of the random signal is configurable, a radar receiver channel including:

an RF frontend that is configured to receive the test signal and to down-convert the test signal into a baseband to provide a baseband signal, and a baseband signal processing circuit configured to receive the baseband signal and to attenuate, by an attenuator circuit, the baseband signal with a configurable attenuation;

a digital-to-analog converter configured to digitize an output signal of the baseband signal processing circuit;

a system controller configured to control an operation of the test signal generator and to control the attenuator circuit to set the power of the random signal and the configurable attenuation of the attenuator circuit; and a processing circuit configured to:

process the digitized output signal of the baseband signal processing circuit;

determine a noise parameter of an output signal of the baseband signal processing circuit to obtain a first noise value, the noise parameter being determined to obtain the first noise value while the power of the random signal is set to a first power value and the configurable attenuation is set to a first attenuation value;

determine the noise parameter of the output signal to obtain a second noise value, the noise parameter being determined to obtain the second noise value while the power of the random signal is set to a second power value and the configurable attenuation is set to the first attenuation value;

determine the noise parameter of the output signal to obtain a third noise value, the noise parameter being determined to obtain the third noise value while the power of the random signal is set to the first power value and the configurable attenuation is set to a second attenuation value;

determine the noise parameter of the output signal to obtain a fourth noise value, the noise parameter being determined to obtain the fourth noise value while the power of the random signal is set to the second power value and the configurable attenuation is set to the second attenuation value; and determine a value representing a noise figure of the radar receiver channel based on the first noise value, the second noise value, the third noise value, and the fourth noise value.

12. The radar system of claim 11, wherein the processing circuit is further configured to:

determine a gain value of the radar receiver channel, wherein the value representing the noise figure is determined further based on the determined gain value.

13. The radar system of claim 11, wherein, to determine the value representing the noise figure, the processing circuit is configured to:

calculate a first ratio between the first noise value and the second noise value;

calculate a second ratio between the third noise value and the fourth noise value; and calculate the value representing the noise figure based on the first ratio and the second ratio.

14. The radar system of claim 13, wherein the value representing the noise figure is calculated further based on a parameter characterizing a behavior of the attenuator circuit.

15. The radar system of claim 11, wherein, to determine the value representing the noise figure, the processing circuit is configured to:

calculate a first ratio between the first noise value and the second noise value;

calculate a second ratio between the third noise value and the fourth noise value; and calculate a noise figure value NFDUT of the radar receiver channel in accordance with:

$$NFDUT = (Y1 - 1)(NFatt - 1)/(GRX(Y0 - Y1)),$$

wherein Y0 denotes the first ratio, Y1 denotes the second ratio, GRX denotes a gain value of the radar receiver channel, and NFatt denotes a parameter characterizing a behavior of the attenuator circuit.

16. The radar system of claim 15, wherein the parameter characterizing the behavior of the attenuator circuit depends on the configurable attenuation of the attenuator circuit and a reflection coefficient at an input of the attenuator circuit.

17. The radar system of claim 16, wherein the first attenuation value is substantially 0 dB.

18. The radar system of claim 14, wherein the attenuator circuit includes switches configured to connect, between an input of the attenuator circuit and an output of the attenuator circuit, an attenuator having the second attenuation value or a line that provides a short circuit between the input of the attenuator circuit and the output of the attenuator circuit to provide the first attenuation value of substantially 0 dB.

19. The radar system of claim 11, wherein the random signal has an in-phase component and a quadrature component which are modulated onto the RF signal using an IQ modulator.

20. The radar system of claim 19, wherein the in-phase component and the quadrature component are provided by a digital-to-analog converter that receives corresponding in-phase and quadrature digital pseudo-random sequences.

*   *   *   *   *